J. V. CLARK.
PACKING.
APPLICATION FILED APR. 27, 1911.
1,013,745.
Patented Jan. 2, 1912.
2 SHEETS—SHEET 1.
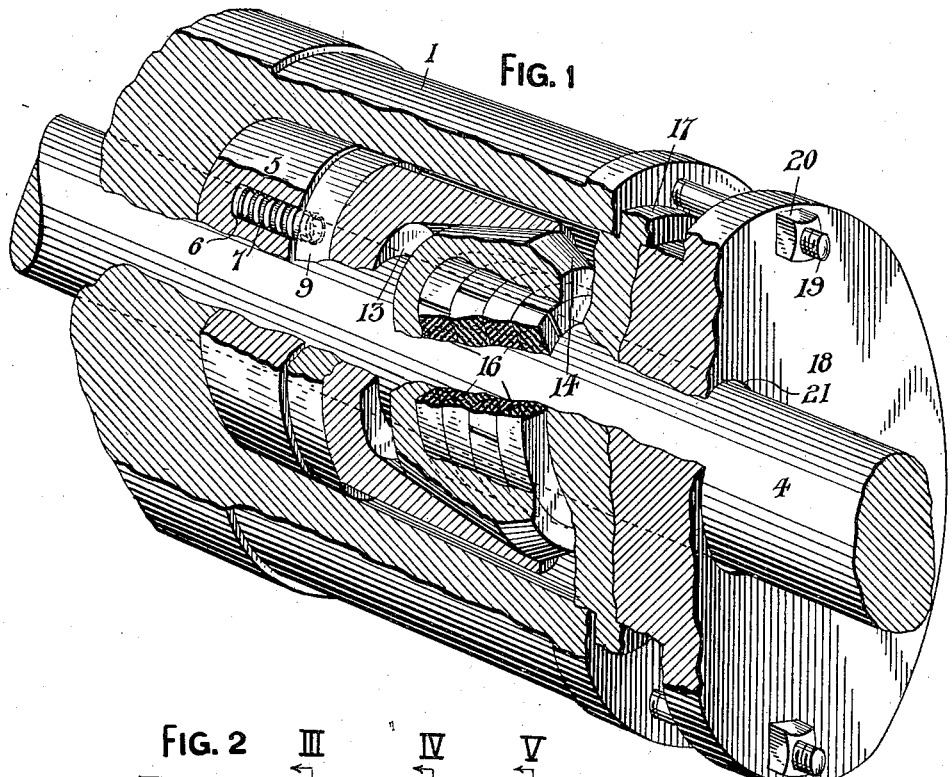
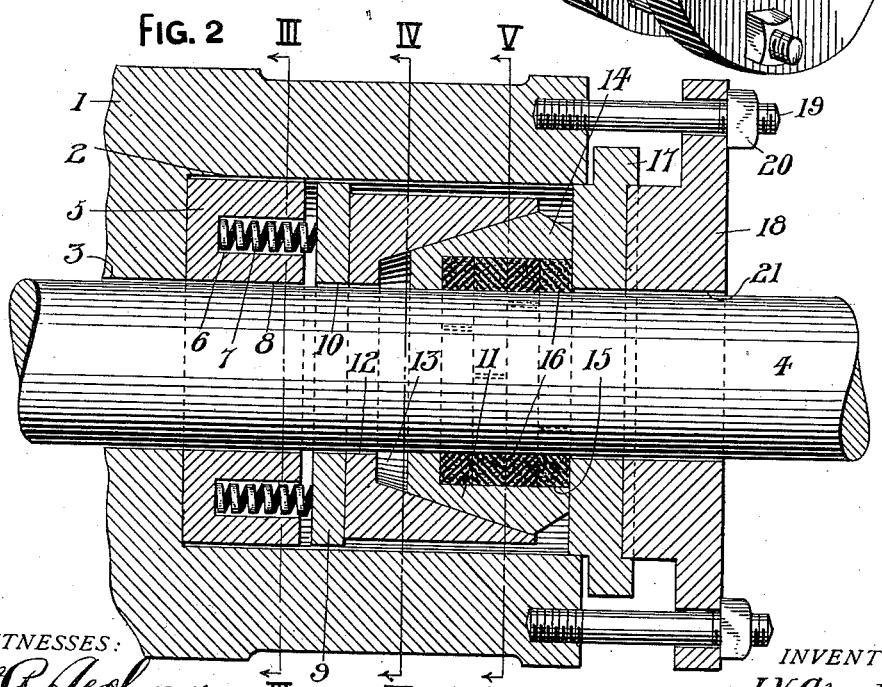
WITNESSES:
INVENTOR.
J. V. Clark
BY
ATTORNEYS

J. V. CLARK.
PACKING.
APPLICATION FILED APR. 27, 1911.

1,013,745.

Patented Jan. 2, 1912.

2 SHEETS—SHEET 2.

WITNESSES:

INVENTOR.
J. V. Clark
BY
ATTORNEYS

UNITED STATES PATENT OFFICE.

JOSEPH V. CLARK, OF STEUBENVILLE, OHIO.

PACKING.

1,013,745.  Specification of Letters Patent.  Patented Jan. 2, 1912.

Application filed April 27, 1911. Serial No. 623,654.

*To all whom it may concern:*

Be it known that I, JOSEPH V. CLARK, a citizen of the United States of America, residing at Steubenville, in the county of Jefferson and State of Ohio, have invented certain new and useful Improvements in Packings, of which the following is a specification, reference being had therein to the accompanying drawing.

This invention relates to packings and more particularly to the type of packing commonly known as a "metallic" packing for piston rods, sucker rods and other movable bodies requiring an air, steam or fluid-tight connection.

The primary object of my invention is to provide a metallic packing wherein a plurality of packing elements are employed for positively insuring a tight connection between the elements and the body movable in said elements.

Another object of this invention is to furnish a stuffing box with novel means, in a manner as will be hereinafter set forth, for maintaining the packing or stuffing material of the box in snug engagement with the body that passes through said box.

A further object of this invention is to provide a stuffing box with a metallic packing that can be easily and quickly assembled and maintained in an operatable condition.

I attain the above objects by a mechanical construction that is simple, durable, inexpensive to manufacture and highly efficient for the purposes for which it is intended.

The invention will be hereinafter specifically described and then claimed, and reference will now be had to the drawings, wherein:—

Figure 3:
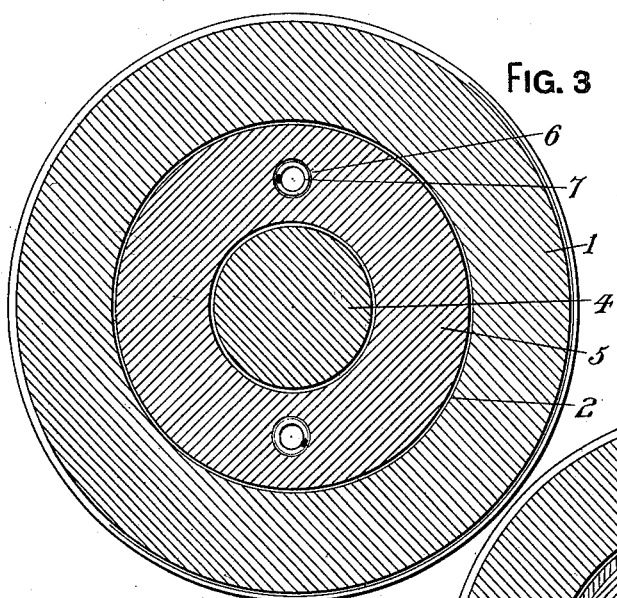
Figure 4:
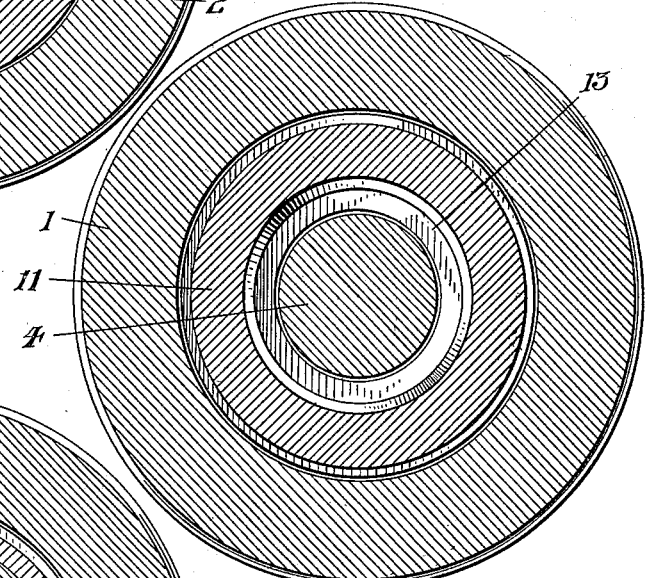
Figure 5:
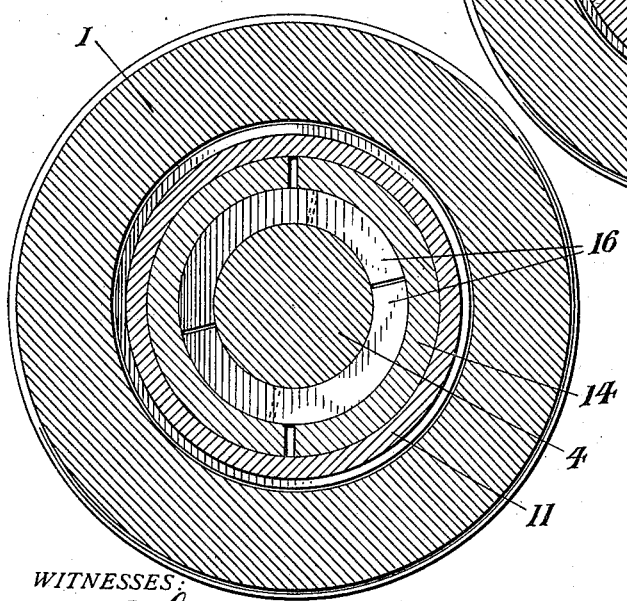
Figure 6:
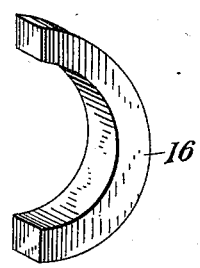

Figure 1 is a perspective view of a stuffing box partly broken away and partly in section, showing the packing contained therein, Fig. 2 is a longitudinal sectional view of the stuffing box, Fig. 3 is a cross sectional view of the stuffing box taken on the line III—III of Fig. 2, Fig. 4 is a similar view taken on the line IV—IV of Fig. 2, Fig. 5 is a similar view taken on the line V—V of Fig. 2, and Fig. 6 is a perspective view of a detached section of a packing ring.

As an example of a housing for the metallic packing, I have illustrated a stuffing box 1 that can be suitably attached to the head of a cylinder or formed integral therewith, the box having a large cylindrical recess 2 with the bottom thereof provided with a communicating opening 3, which permits of a piston rod or other body 4 passing longitudinally through the box 1.

Arranged within the recess 2 against the bottom thereof is a circular spring holder 5 having a plurality of sockets 6 in the forward face thereof for coiled compression springs 7. The sockets 6 are arranged circumferentially of the opening 8 of said holder through which the rod 4 extends. The outer convolutions of the springs 7 are adapted to engage the rear side of a face plate 9 having a central opening 10 providing clearance for the rod 4. The face plate 9 engages the rear face of a cylindrical adjusting member 11, said member having an opening 12 providing clearance for the rod 4, and the forward face thereof provided with a conical-shaped recess 13, the purpose of which will presently appear.

Extending into the conical-shaped recess of the member 11 is a sectional conical-shaped pressure member 14, preferably made of two sections embracing the rod 4. The pressure member 14 has an annular recess 15 adapted to receive a plurality of sectional packing rings 16, each ring consisting preferably of two sections. The rings 16 snugly fill the recess 15 and are retained therein by a gland 17 fitted in the end of the recess 2. Engaging the gland 17 is a cap 18 and said cap is detachably mounted upon stud bolts 19, carried by the box 1. Nuts 20 or other fastening means are employed for retaining the cap 18 upon the bolts 19. The gland 17 and the cap 18 have longitudinally alining openings 21 providing clearance for the rod 4.

From the foregoing it will be observed that I have devised novel means for normally retaining the packing or stuffing of a box in engagement with the body movable in said box, the means employed compensating for the wear and tear upon the packing and insuring a non-leakable connection between the stuffing box and the body that passes through said box.

While in the drawings there is illustrated a preferred embodiment of the invention, it is to be understood that the structural elements thereof are susceptible to such changes as fall within the scope of the appended claims.

What I claim is:—

1. A packing comprising a stuffing box, an annulus mounted against the inner end of said box and formed in one face with a circumferentially-extending series of sockets, springs mounted in and projecting from said sockets, an apertured disk positioned against the projecting ends of said spring, a cylindrical adjusting member positioned against said disk and formed with a conical-shaped recess, a sectional truncated cone-shaped pressure member mounted in said recess and provided with an annular recess, sectional packing rings snugly fitting said annular recess, a gland extending in the stuffing box and engaging the outer packing ring and said pressure member for maintaining the ring and said member in position, and means engaging said gland and adjustably connected to said stuffing box for securing the gland in position whereby the packing rings are maintained in said annular recess and the pressure member held from outward movement with respect to the adjusting member.

2. A packing comprising a stuffing box, a cushion face plate arranged therein, a cylindrical adjusting member positioned against the face plate and provided with a conical-shaped recess, a frusto conical-shaped pressure member extending in said recess to a point removed from the inner end of said recess and provided with an annular recess, a packing completely filling said annular recess, a packing gland extending in said stuffing box and engaging said packing and said pressure member for maintaining the latter in an adjusting member and the packing in said annular recess, and means for securing the packing gland in position.

In testimony whereof I affix my signature in the presence of two witnesses.

JOSEPH V. CLARK.

Witnesses:
 FRANK J. COLLINS,
 VINCENT A. M. MORELL.

---

Copies of this patent may be obtained for five cents each, by addressing the "Commissioner of Patents, Washington, D. C."